No. 704,937. Patented July 15, 1902.
A. W. SCHRAMM.
DENTAL ENGINE.
(Application filed Mar. 3, 1900.)
(No Model.) 2 Sheets—Sheet 1.
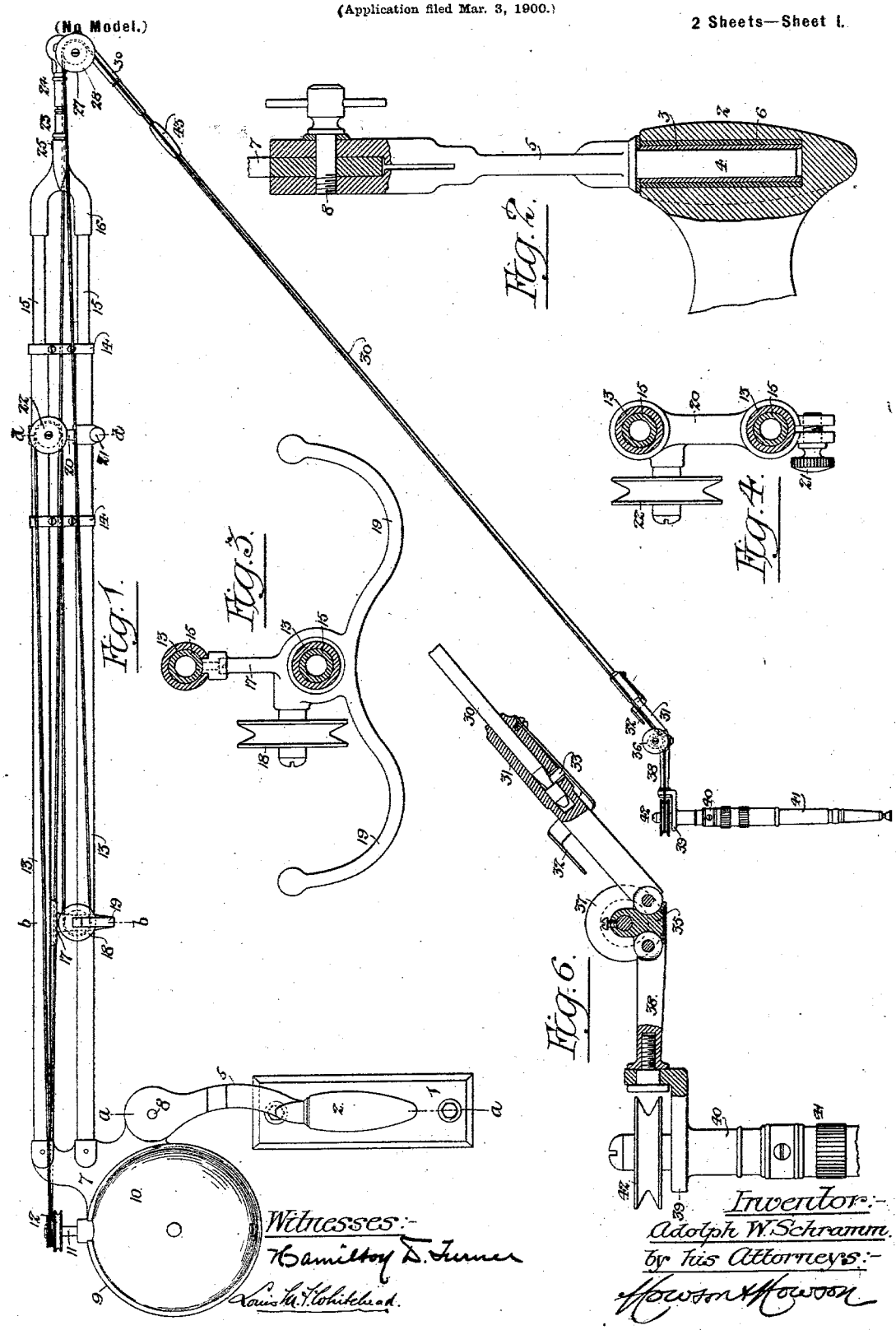
Witnesses:
Hamilton D. Turner
Louis W. Whitehead
Inventor:—
Adolph W. Schramm.
by his Attorneys:—
Howson & Howson No. 704,937. Patented July 15, 1902.
A. W. SCHRAMM.
DENTAL ENGINE.
(Application filed Mar. 3, 1900.)
(No Model.) 2 Sheets—Sheet 2.
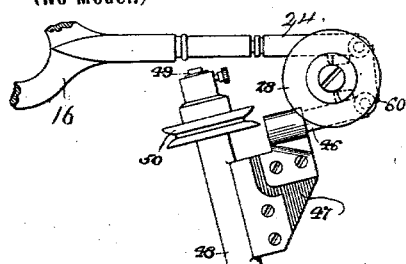
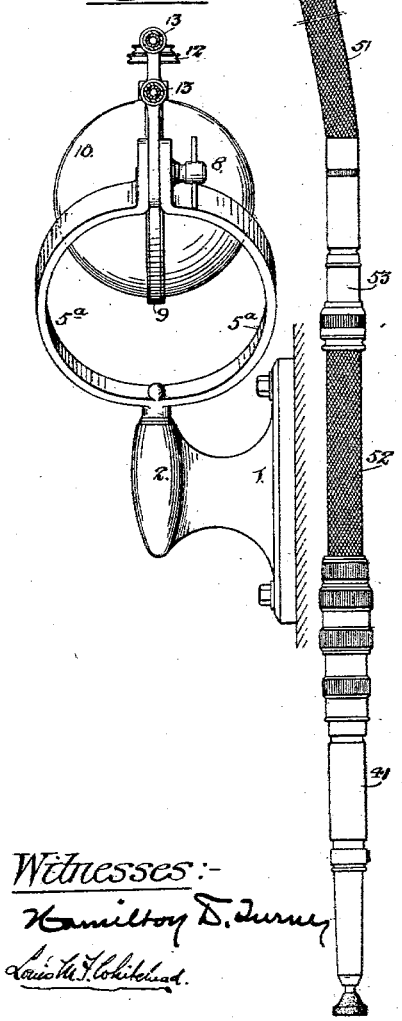
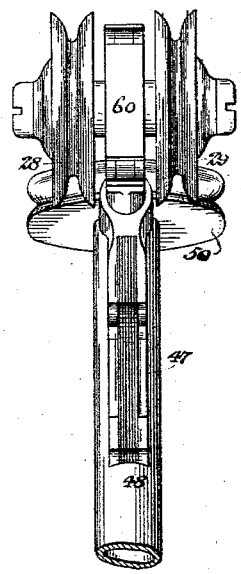
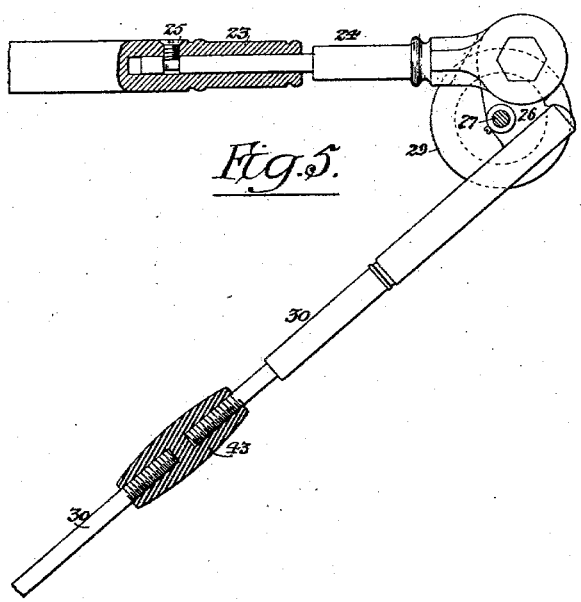
Fig. 7.
Fig. 9.
Fig. 8.
Fig. 5.
Witnesses:—
Inventor:—
Adolph W. Schramm
— by —
his Attorneys:—

UNITED STATES PATENT OFFICE.

ADOLPH W. SCHRAMM, OF PHILADELPHIA, PENNSYLVANIA, ASSIGNOR TO THE ELECTRO DENTAL MANUFACTURING COMPANY, OF CAMDEN, NEW JERSEY, A CORPORATION OF NEW JERSEY.

DENTAL ENGINE.

SPECIFICATION forming part of Letters Patent No. 704,937, dated July 15, 1902.

Application filed March 3, 1900. Serial No. 7,211. (No model.)

*To all whom it may concern:*

Be it known that I, ADOLPH W. SCHRAMM, a citizen of the United States, residing in Philadelphia, Pennsylvania, have invented an Improvement in Dental Engines, of which the following is a specification.

My invention consists of an improved device for transmitting power from a motor to the handpiece of a dental or other light instrument, one object of my invention being to so counterbalance the device that it can be moved without effort to any desired position, a still further object being to so combine the various parts that the device shall be convenient to operate. These objects I attain in the manner hereinafter set forth, reference being had to the accompanying drawings, in which—

Figure 1 is a side view of a dental engine constructed in accordance with my invention. Fig. 2 is an enlarged transverse section on the line $a$ $a$, Fig. 1. Fig. 3 is a view, partly in elevation and partly in transverse section, on the line $b$ $b$, Fig. 1, also on an enlarged scale. Fig. 4 is a view, partly in elevation and partly in transverse section, on the line $d$ $d$, Fig. 1, likewise enlarged. Fig. 5 is an enlarged sectional view of the joint between the telescopic arm and swinging rod of the device. Fig. 6 is an enlarged sectional view of the joint between said swinging rod and the handpiece-carrier. Fig. 7 is a side elevation illustrating a special feature of the invention. Fig. 8 is an enlarged end view of part of the same, and Fig. 9 is a view illustrating another special feature of the invention.

In Figs. 1 and 2 a wall-bracket or other suitable support for the motor and power-transmitting device is represented at 1, this bracket having a socket 2, in which is contained a sleeve 3, forming a bearing for the stem 4 of a post 5, a cushion 6, of rubber or other equivalent elastic or semi-elastic material, being interposed between the sleeve 3 and the socket 2, so as to absorb vibration which might otherwise be transmitted to said socket, as well as to prevent the noise which might arise from such vibration. The rubber cushion may, if desired, be interposed between the stem 4 and sleeve 3 with a snug fit, so that the stem will not turn therein, the sleeve 3 turning in the socket. The upper end of the post 5 is forked, as shown in Fig. 2, for the reception of a projecting portion of a plate 7, which is pivotally mounted upon a transverse pin 8, having a head bearing upon one leg of the fork of the post 5 and a threaded end adapted to a threaded opening in the other leg of the same, so that by tightening said pin the forked portion of the post can be caused to bind upon the plate 7 with any desired degree of pressure and can thus form a friction-joint which will retain the plate in any position of adjustment to which it may be moved. The plate 7 has secured to or forming part of it a circular yoke 9, Fig. 1, in which is supported a motor of any available character—hydraulic, pneumatic, electric, or the like—an electric motor being preferred. Part of the casing of said motor is illustrated at 10 and the rotated shaft of the same at 11, said shaft being provided with a double-grooved pulley 12. In some cases I prefer to make the post 5 in the form of a yoke, as shown at $5^a$ in Fig. 9, so that the motor can swing down through the same, and thereby increase the possible range of movement, or a half-yoke may be used, if desired. This construction forms part of a frame, as hereinafter described, it being noted that the motor 10 is preferably supported, as shown in Fig. 1, so that the vertical line passing through the center of the socket 2 passes between the center of gravity of the mass formed by the motor and a portion of the frame and the center of gravity of the mass formed by the remainder of the frame. In addition to the advantage that such construction offers for the best arrangement of the operating-belt and its pulleys it will be seen that the movable parts as a whole consist of two rigidly-connected masses substantially balanced on the pivot formed by the socket 2, such combination remaining in any given position without tendency to move.

Secured to and projecting from the plate 7 are a pair of tubes 13, suitably braced and stiffened at and near their outer ends by means of transverse stays 14, and within these tubes are mounted, so as to be free to slide, a pair of tubes 15, connected at their outer ends by a yoke 16, the two sets of tubes thus forming a telescopic structure which can be expanded or contracted in accordance with the position in which the tool is to be used.

The inner end of one of the tubes 15 is connected to a bar 17, which projects through a slot in the under side of one of the tubes 13, so that it does not interfere with the free longitudinal movement of the tube 15 therein, said bar 17 embracing the other tube 13, which thus serves as a guide therefor. (See Fig. 3.)

Upon a stud projecting from the bar 17 is mounted a grooved pulley 18, and from the under side of the bar project laterally in each direction curved hooks or fingers 19, for a purpose described hereinafter.

Upon the tubes 13, near the outer ends of the same, is mounted another bar 20, the lower portion of which is split and acted upon by a tightening-screw 21, so that it forms a friction-clamp embracing the lower tube 13. Hence said bar 20 can be adjusted longitudinally upon the tubes 13 and readily secured in position after adjustment. Upon a projecting stud on the bar 20 is mounted another grooved pulley 22.

Projecting from the yoke 16 is a tubular boss 23, to which is adapted a spindle 24, grooved at its inner end for engagement with a retaining-screw 25, as shown in Fig. 5, so that said spindle 24 is longitudinally confined to the boss 23, but can turn freely therein.

Hung to the outer end of the spindle 24 is a plate 26, having a laterally-projecting spindle 27, upon which are free to turn two pulleys 28 and 29, one on each side of the plate 26, and secured to or forming part of said plate is the upper end of a rod 30, carrying at its lower end the handpiece of the tool in the manner shown in Figs. 1 and 6, on reference to which it will be observed that the lower end of the rod fits into a short tube 31, upon which is mounted an elastic thumb-piece 32, having a pin 33, which passes through an opening in the tube 31 and engages with a groove in the lower portion of the rod 30, so that the tube is free to turn on said rod, but is longitudinally confined thereto.

Hung to the end of the tube 31 is a block 35, which has a laterally-projecting spindle or stud upon which are mounted two grooved pulleys 36 and 37, and to said block 35 is hung a short rod 38, to the outer end of which is swiveled the handpiece-carrier 39, said carrier having mounted therein, so as to be free to turn around its axis, a short tubular stem 40, to which is directly connected the handpiece 41.

The tool shaft or spindle passes up through the tube 40 and has secured to its upper end a pulley 42, which receives the driving-belt from the pulley 12 on the motor-shaft, the two runs of said belt passing from the pulley 42 to and around the pulleys 36 and 37 and thence up to and around the pulleys 28 and 29, one run of the belt passing from the pulley 29 directly to the pulley 12 and the other run of said belt passing from the pulley 28 to and around the pulley 18 on the slide-bar 17, thence forwardly to and around the pulley 22 on the bar 20, and thence to the driving-pulley 12. By this means the pulley 18 will always take up or give out a length of belt equal to twice the length of movement of the sliding portion of the telescopic frame. Hence the driving-belt will always be kept tight under any position of adjustment of said frame. The swiveled spindle 24 and pivoted plate 26 provide with but a single joint all needed flexibility for the rod 30, and the pulley-spindle 27 bears such relation to the pivot of said plate and to the rod that the longitudinal swinging movements of the latter are, on the one hand, not restricted by a tightening of the belt and, on the other hand, do not cause such a slackening of the belt as to interfere with its driving properties. There is a swinging and swiveled connection between the lower end of the rod 30 and the handpiece-carrier 39, in addition to which there is the swiveling of said handpiece to the rod 38 and the swiveling of the tube 40 to the carrier, so that ample freedom and flexibility of movement of the handpiece is permitted.

It will be observed on reference to Fig. 1 that the motor and its carrier occupy a position on one side of the pivotal fulcrum-pin 8 and the telescopic frame and its attachments occupy a position on the other side of said fulcrum-pin, so that the weight of the motor and motor-frame counterbalances the weight of the telescopic frame and its attachments, and thereby renders the movements of the device very easy.

To prevent transmission of the electric current from the motor or motor-casing to the handpiece when an electric motor is employed as a driving medium, I insert in the rod 30 a short section 43 of insulating material, as shown in Figs. 1 and 5.

When the instrument is not in use, the rod 30 may be lifted and dropped into either of the hooks 19 of the bar 17, so as to be supported out of the way.

In Figs. 7 and 8 I have shown a special embodiment of my invention in which short lengths of flexible shafting are employed between the telescopic frame and the handpiece. In this case a bar 60 is pivoted to the spindle 24 and to a short rod 46, which is connected by a block 47 of insulating material to a short tube 48, through which passes a shaft or spindle 49, carrying the pulley 50, to which the power is to be transmitted, and which receives the belt directly from the pulleys 28 and 29, which are mounted upon the bar 60. The shaft or spindle 49 is connected by the flexible shaft to the shaft or spindle of the handpiece 41, said flexible shaft having in the present instance two lengths of flexible casing 51 and 52, with a short intervening tubular metallic casing 53, as shown in Fig. 7. By the use of the rod 46 and connecting-block 47 the tube 48, which carries the upper section of the flexible-shaft casing, swings in under the outer end of the telescopic frame, so that the flexible shaft and casing will hang down therefrom in the best position for the manipulation of the handpiece by the operator, rendering unnecessary the flexing of the shaft which is required when said shaft is connected to a longitudinal shaft on the top frame. Moreover, the universal joint which is provided by the swiveled rod 24 and pivot-block 60 relieves the flexible shaft from the lateral strain to which it is subjected when the connection is permitted to swing in a longitudinal direction only. The jointed-rod and flexible-shaft constructions can be used interchangeably, the swivel-rods 24 of both being alike adapted to the hollow boss 23.

Having thus described my invention, I claim and desire to secure by Letters Patent—

1. The combination of a motor rigidly connected to a frame carrying operating mechanism, a support connected to said parts by a pivot allowing rotation of the same around a vertical axis, said axis passing between the centers of gravity of the motor and of the frame and its attached parts, substantially as described.

2. The combination of a motor rigidly connected to a frame carrying operating mechanism, a support connected to said parts by a pivot allowing rotation of the same around a vertical axis, a member connecting the motor and frame with the said support, the same being connected thereto by a horizontal pivot permitting motion of said parts in a vertical plane, both the said pivots being between the centers of gravity of the motor and of the frame, substantially as described.

3. The combination of a support, a frame pivoted thereto, and a motor carried by the frame, said support including a yoke through which said motor is free to swing, substantially as described.

4. The combination of a yoke having supporting means permitting motion around a vertical axis, a motor and frame connected to said yoke by a pivotal joint, means for imparting friction to said joint and thereby retaining the motor with its attached frame in any desired position, substantially as described.

5. The combination of a pivotal frame, a post to which the same is pivoted, a vertical socket and a rigid sleeve and elastic cushion interposed between said post and the socket, substantially as described.

6. In a device of the character described, the combination of a frame, a plate pivotally carried thereby, a handpiece attached to said plate, mechanism, including a pulley, for operating a tool carried by said handpiece, and other pulleys carried on the plate, the latter pulleys being placed on said plate relatively to the pulley of the operating mechanism so that the distance from a fixed point on the frame around the pulleys on the plate to the pulley of the operating mechanism will remain substantially constant irrespective of the relative positions of the said handpiece, the plate and the frame, substantially as described.

In testimony whereof I have signed my name to this specification in the presence of two subscribing witnesses.

ADOLPH W. SCHRAMM.

Witnesses:
F. E. BECHTOLD,
JOS. H. KLEIN.